(12) United States Patent
Li

(10) Patent No.: US 6,208,118 B1
(45) Date of Patent: Mar. 27, 2001

(54) FAR-DISTANCE REMOTELY CONTROLLABLE RECTIFIER WITH BACK-UP BATTERY

(75) Inventor: Yung-Feng Li, Shijr (TW)

(73) Assignee: Digi Power Manufacturing Inc., Shijr (TW)

( * ) Notice: Subject to any disclaimer, the term of this patent is extended or adjusted under 35 U.S.C. 154(b) by 0 days.

(21) Appl. No.: 09/441,047

(22) Filed: Nov. 16, 1999

(51) Int. Cl.[7] .................................. H01M 10/46
(52) U.S. Cl. ............................. 320/137; 320/140
(58) Field of Search .................... 320/134, 136, 320/103, 127, 128, 140, 137

(56) References Cited

U.S. PATENT DOCUMENTS 4,885,766 * 12/1989 Yasuoka et al. .

5,825,283 * 10/1998 Camhl .

* cited by examiner

Primary Examiner—Edward H. Tso
(74) Attorney, Agent, or Firm—Bacon & Thomas, PLLC

(57) ABSTRACT

A far-distance remotely controllable rectifier with a back-up battery may be applied to any electric appliance that requires a rectifier, and particularly to a wireless phone or the like telecommunication equipment, to serve as an uninterrupted power supply. A replaceable and rechargeable back-up battery and a ring-controlled switch circuit are provided to the rectifier of this invention to keep the machine working in case of an unexpected failure of the civil power or in response to detection of a phone call from a far distance to a ring-controlled switch for effecting a continuous power supply. Under normal conditions, the civil power is used to charge the back-up battery as a stand-by power source.

2 Claims, 2 Drawing Sheets

FAR-DISTANCE REMOTELY CONTROLLABLE RECTIFIER WITH BACK-UP BATTERY

BACKGROUND OF THE INVENTION

1. Field of the Invention

This invention relates generally to a remotely controllable rectifier, and more particularly, to a rectifier provided with an inside rechargeable back-up battery serving as an uninterrupted power supply which is remotely controlled from a far place by detecting phone rings.

2. Description of the Prior Art

A rectifier which plays, an indispensable role in almost every kind of household electric appliance nowadays, is used to convert the civil alternating current (AC) into a direct current (DC). However, in the case of an unexpected power failure caused by insufficiency of power source, impairment of transformer station, or breakdown of a power transmission circuit of the electric power company, people might get annoyed due to lack of an uninterrupted power supply (UPS).

Besides, generally speaking, a maker of household electric appliance would rather care more about the function of his products than about the rectifier, and needless to say management and control of the power supply. Further, the electric appliance usually could be controlled only by people on the spot; it seemed a mission impossible for people to actuate the power supply from somewhere a long distance away during the old days.

In view of the above-described imperfections, after years of constant effort in research, the inventor of this invention has consequently developed and proposed this improved mechanism pertaining to the subject matter of a remotely controllable rectifier.

SUMMARY OF THE INVENTION

The primary object of this invention is to provide a rectifier with a replaceable and rechargeable back-up battery that can supply power during a failure of civil power.

Another object of this invention is to provide a rectifier that can keep the DC power available actuated by detecting of a phone call.

For realizing the abovesaid remotely controllable rectifier, this invention comprises an AC/DC converter, a charger, a battery detector, a DC/DC converter, a controller, a pilot lamp, a replaceable and rechargeable back-up battery, and a ring detector. The AC/DC converter is employed to convert the civil AC power into a DC power supply via a transformer and a bridge rectifier. The charger is used to charge the battery when the civil power is available and control the charging voltage and current appropriately to obtain a best efficacy and prolong lifetime of the battery. The battery detector used to detect a battery power is offered with a resistor-divided voltage in addition to the battery power for applying a voltage signal to the controller to shut down the battery power if necessary to avoid over-discharge. The DC/DC converter is used for converting DC power, which may come from the civil AC power or the battery, into another stable DC power as desired. The controller is composed of some electronic circuits or a programmed microprocessor for controlling the DC/DC converter to output or not output DC power according to the state of a power switch, the battery, phone bell. etc. The pilot lamp is employed to indicate the present output state of the rectifier. The replaceable and rechargeable back-up battery is placed in a battery compartment of a machine case. The ring detector is used to an detect alternating signal of a phone ring which will be rectified by a bridge rectifier to become a discrete DC signal and thereby to drive a photocoupler to create a grounded signal for the controller to judge and take a due action.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
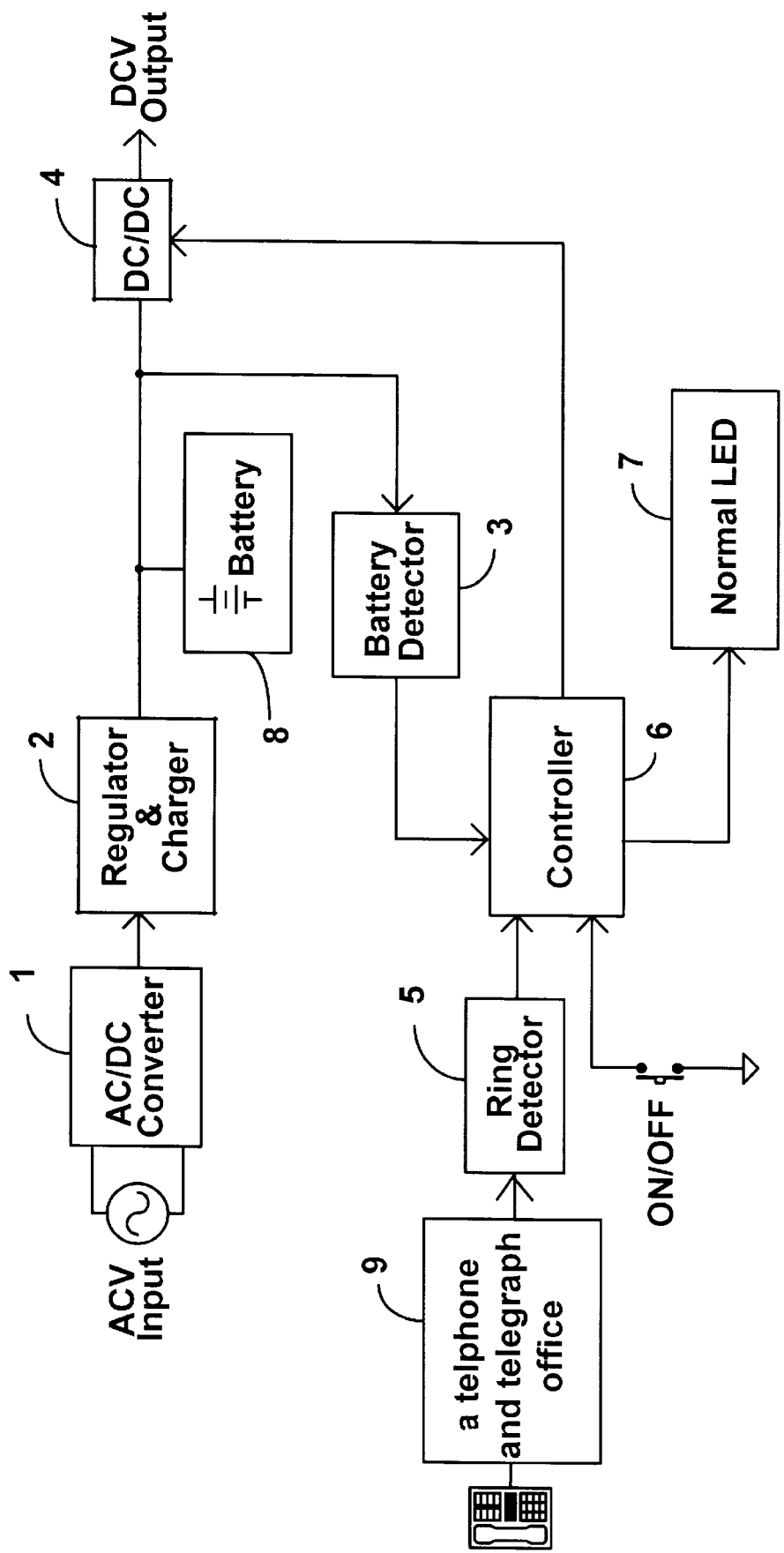
FIG. 1 is a circuitry block diagram of a far-distance remotely controllable rectifier with back-up battery of this invention.

As shown in FIG. 1, the civil alternating power is applied to an AC/DC converter 1 for conversion into DC main power which is, in turn, applied to a DC/DC converter 4 on the one hand and to an external rechargeable battery 8 for conducting a constant voltage and constant current charging process via a charger 2. Meanwhile, a battery detector 3 detects the voltage of the rechargeable battery 8 and provides a signal to a controller 6 for discrimination. A ring detector 5 is employed to detect a ring signal made by an input phone call through a telephone office 9 and transmit the ring signal to the controller 6 as a basis for determining whether power should be output by the DC/DC converter 4. The controller 6 is arranged as to receive a voltage signal of the battery, a ring signal, a power switch signal, or an output power signal, and then judge and control the DC/DC converter 4 to decide if an output power and a related pilot lamp 7 should be effected.

Figure 2:
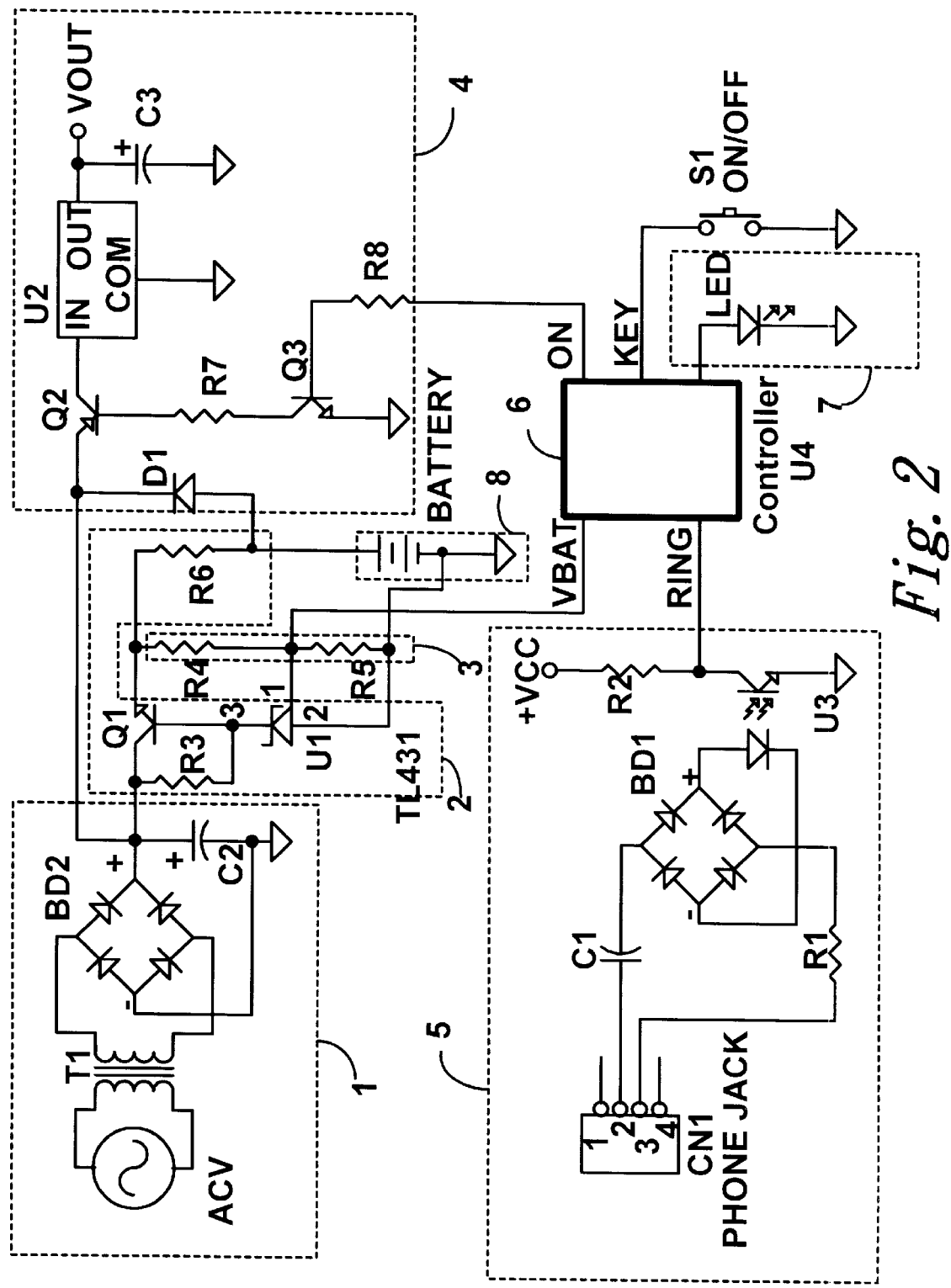
FIG. 2 is a schematic circuit diagram of the far-distance remotely controllable rectifier with back-up battery of this invention.

Referring to FIG. 2, the civil AC power is rectified by the AC/DC converter 1 composed of element T1, BD2, and C2 to create a DC power supply. The charger 2 charges the battery 8 under controlled voltage and current when the civil power is available. The charge current is confined by a limit resistor during low battery voltage while the charge voltage is confined by a charge circuit during high battery voltage to thus prevent the battery voltage from exceeding a rated value to ensure charge efficacy and prolong lifetime of the battery. The representative circuit comprises element U1, Q1, R3, R4, R5, and R6. The battery detector 3 offered with a resistor-divided input voltage in addition to the battery power provides a voltage signal to the controller 6. In the case the battery is in charge of supplying power to the circuits, the controller 6 will judge if it's necessary to shut down the power supply on basis of the abovesaid voltage signal provided by the battery detector 3 to avoid "over discharge phenomenon" of the battery for prolonging its lifetime, where the related circuit consists of element R4, R5, R6, U4. The DC/DC converter 4 comprising element U2, C3 converts the DC power from the AC/DC converter 1 or the battery into another DC level acceptable to the circuits, such as 5V, 9V, etc. The ring detector 5 is employed to pick up the ring signal through a capacitor C1, and the alternating signal is then rectified by a bridge rectifier BD1 to create a DC signal applied to a light-emitting diode (LED) in a photocoupler U3 without risk of destroying or burning down the LED by a reverse bias. A resistor RI is utilized for limiting current through the LED, and when the LED is illuminated, a transistor in the photocoupler U3 becomes conductive to lower the ring signal from a normal voltage +VCC down to the ground. Also, when a phone call is put through, the line voltage changes from the alternating ring signal to a DC voltage that is isolated by the capacitor C1. Therefore, the ring detector 5 can only pick up the ring signal without being influenced by any DC voltage. The controller 6 representatively comprising elements U4, S1, R8, Q3, R7, Q2 may be built with some electronic elements or a programmed microprocessor for judging input signals from the power switch, the battery, the ring, etc to decide if the DC/DC converter 4 should effect an output power supply.

Form the abovesaid, the merits of this invention may be summarized as the following:

1. The rectifier with back-up battery can work continuously even under a failure state of the civil power and it is possible to meanwhile back up some other electric appliances that lack a UPS function.
2. A ring signal of a phone call from a telephone and telegraph office is detected by a simple ring detector, then rectified and converted into a DC control signal for a controller to control output of the DC voltage.

Although, this invention has been described in terms of preferred embodiments, it is apparent that numerous variations and modifications may be made without departing from the true spirit and scope thereof, as set forth in the following claims.

What is claimed is:

1. A far-distance remotely controllable rectifier with a back-up battery, comprising:

an AC/DC converter arranged to convert alternating electric power by means of a transformer and a first bridge rectifier into DC electric power a charger circuit including a transistor and an adjustable voltage regulating diode arranged to charge said back-up battery with said DC electric power from said AC/DC converter, wherein said back-up battery is replaceable and rechargeable, and is capable of accepting said DC electric power from said AC/DC converter and of being replaced;

a DC/DC converter arranged to receive said DC electric power from said AC/DC converter and to convert said DC electric power from said AC/DC converter into a DC output having a predetermined voltage, said DC/DC converter being further connected to said back-up battery to receive DC electric power from said back-up battery in case said AC electric power fails;

a battery detector including a voltage divider made up of resistors and arranged to detect a voltage of said back-up battery and provide a signal to a control circuit to shut down the back-up battery in time to avoid over-discharge;

a controller connected to an output of said battery detector, an output of a phone ring detector, a power switch, and a control input of said DC/DC converter, said controller being arranged to receive an input signal from said power switch, to receive said signal from to receive a Rounded signal output by said phone ring detector, and to control said DC output of said DC/DC converter based on said input signal from said power switch, said signal from said battery detector, and said grounded signal output by said phone ring detector; and a pilot lamp arranged to show a present output state of said DC/DC converter, wherein said ring detector is arranged to detect an alternating ring signal of a phone call and apply the alternating ring signal to a second bridge rectifier to create a DC voltage to be in turn applied to a photocoupler, said photocoupler being arranged to send said grounded signal to said controller for judging whether said DC/DC converter should effect said DC output.

2. The far-distance remotely controllable rectifier with back-up battery of claim 1, wherein said controller is a programmed microprocessor.

* * * * *